United States Patent
Lamb

[15] 3,667,151
[45] June 6, 1972

[54] ANTIFOULING FISHING SINKER

[72] Inventor: John H. Lamb, 1617 Maryland Avenue South, Minneapolis, Minn. 55426

[22] Filed: Mar. 12, 1970

[21] Appl. No.: 19,053

[52] U.S. Cl. ............................................................43/44.97
[51] Int. Cl. ........................................................A01k 95/00
[58] Field of Search ..................................43/44.97, 41.2, 41

[56] References Cited

UNITED STATES PATENTS

| | | | |
|---|---|---|---|
| 2,292,743 | 8/1942 | Cordry | 43/41.2 |
| 3,151,414 | 10/1964 | Hoerner | 43/44.97 |
| 3,318,037 | 5/1967 | Harrison et al. | 43/44.97 X |

FOREIGN PATENTS OR APPLICATIONS

| | | | |
|---|---|---|---|
| 68,232 | 5/1946 | Norway | 43/41 |
| 166,487 | 3/1959 | Sweden | 43/41.2 |

OTHER PUBLICATIONS

The Condensed Chemical Dictionary, Reinhold Publishing Corp., New York, N.Y. 6th edition, page 235, 1962

Primary Examiner—Samuel Koren
Assistant Examiner—Daniel J. Leach
Attorney—Thomas J. Nikolai

[57] ABSTRACT

A shroud adapted to surround a fishing line sinker to reduce the tendency of said sinker from becoming fouled on the lake or stream bottom, the shroud being formed from a deformable plastic material. The shroud is preferably in the shape of a cylinder having one end thereof formed into a hemispherical dome. An aperture is formed in the dome to permit a swivel or other connector to be forcibly passed therethrough for connection to a fish line.

1 Claim, 2 Drawing Figures

PATENTED JUN 6 1972 3,667,151

INVENTOR
JOHN H. LAMB
BY Thomas J. Nikolai
ATTORNEY

ANTIFOULING FISHING SINKER

BACKGROUND OF THE INVENTION

I have found that in fishing for certain species it is desirable to utilize a leader between the sinker and the lure in which the hooks are located such that the sinker is allowed to intermittently contact or rest on the lake or stream bottom. In trolling, or casting, however, it frequently happens that the sinker will become lodged between rocks or other formations on the bottom of the lake or stream. Lead sinkers are inclined to wedge tightly between rocks because of the soft material of which they are formed. In order to reduce the tendency for the sinker to become lodged, I have designed a shroud for the sinker from a thick deformable plastic material which becomes quite slippery when wet. With the shroud surrounding the sinker, the sinker assembly is less subject to becoming wedged between the rocks when trolling or using rapid stream fishing techniques.

Figure 1:
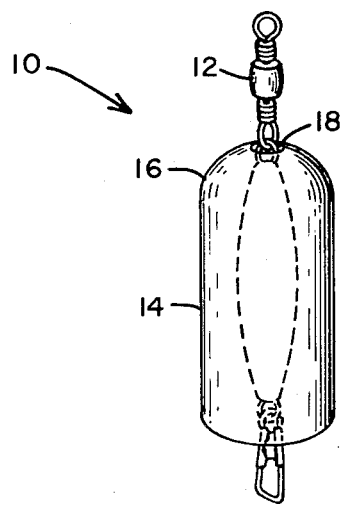
Figure 2:
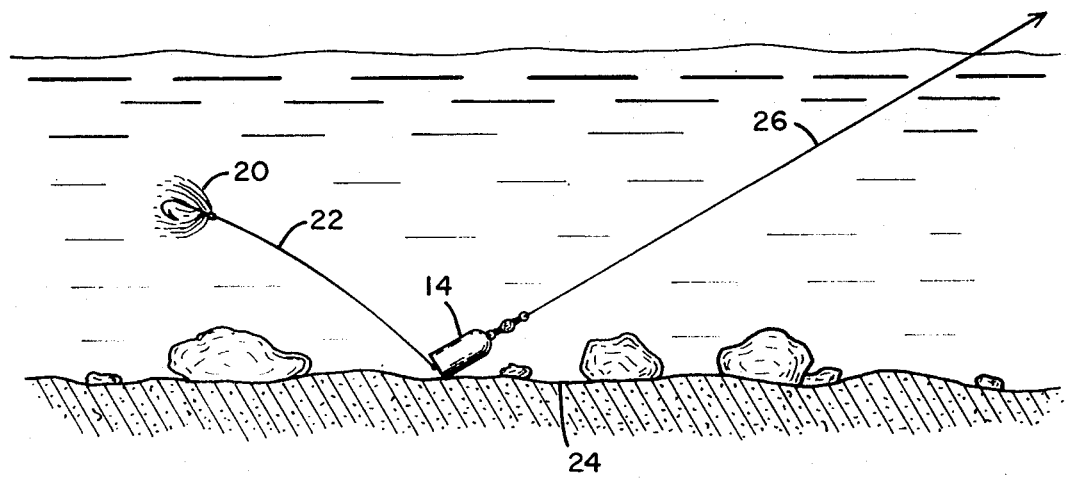

The features of the invention can best be understood by reference to the accompanying drawings in which:

FIG. 1 is a pictorial view of the apparatus comprising the preferred embodiment of the invention, and FIG. 2 illustrates the manner in which the invention is used.

Referring to FIG. 1, there is shown in ghost line form a conventional fishing sinker which may be formed from lead or other suitable material. The sinker has an eye at each end and affixed to the eye at one end 10 is a swivel 12 of conventional design.

Surrounding the sinker is a relatively thick, tough, deformable, slippery-when-wet plastic shroud 14 which is preferably cylindrical in shape but which has a hemispherical dome-shaped portion 16 integrally formed at one end thereof. An aperture 18 extends through the top of the dome and has a diameter slightly smaller than the greatest diameter of the swivel to permit the swivel to be forcibly passed therethrough to a position outside of the shroud.

In FIG. 2, a fishing lure 20 is connected by a long leader 22 to the eye at the trailing end of the sinker so that the lure 20 is allowed to float a predetermined distance above the bottom 24 of the lake or river. The shroud 14 surrounds the sinker as is shown in FIG. 1. The leading end of the sinker is connected through a swivel to the fish line 26 leading to the fisherman (not shown).

While trolling or casting, the sinker encased in the shroud 14 is used to control the lure distance from the bottom. Because of the rounded end of the shroud, the deformable nature of the material from which it is formed, and the slipperiness of the shroud when wet the assembly resists becoming wedged between rocks and the like and facilitates fishing.

I have found that polyvinyl chloride plastic having a thickness in the range of 1/16th inch to ⅛th inch to be optimum, but these dimensions are not critical. Also, it is possible that a shroud having a shape differing from that shown may be suitable.

Having described the preferred embodiment of my invention, what I desire to protect by Letters Patent is:

1. In combination:

A fishing line sinker having a swivel affixed to one end thereof, a hollow cylindrically-shaped member formed from a deformable plastic material, having a specific gravity greater than one said cylinder having a substantially spherical dome-shaped portion integrally formed at one end thereof, said dome-shaped portion having an aperture of a diameter slightly smaller than the greatest diameter of said swivel therethrough, said sinker being contained within said member with said swivel disposed outside of said member during the time that said member is immersed in water.

* * * * *